United States Patent [19]

Lavelle

[11] Patent Number: 4,660,044
[45] Date of Patent: Apr. 21, 1987

[54] SPINNING LINEAR POLARIZATION RADAR MAPPING METHOD

[75] Inventor: Mathew E. Lavelle, Auburn, Wash.

[73] Assignee: The Boeing Company, King County, Wash.

[21] Appl. No.: 527,489

[22] Filed: Aug. 29, 1983

[51] Int. Cl.$^4$ ............................................. G01S 13/89
[52] U.S. Cl. ................................. 342/188; 342/191
[58] Field of Search ............... 343/55 A, 12 R, 5 CE, 343/5 CM, 630.8 C, 636.6 H, 624 OR, 5 MM, 5 VQ, 14, 17, 17.7, 361-366; 342/191, 188

[56] References Cited

U.S. PATENT DOCUMENTS

| | | | |
|---|---|---|---|
| 3,048,837 | 8/1962 | Hart | 343/16 R |
| 3,148,367 | 9/1964 | Ochiai | 343/5 CD |
| 3,357,013 | 12/1967 | Hart | 343/361 |
| 3,403,394 | 9/1968 | Rouault | 343/5 R |
| 3,403,397 | 9/1968 | Harrington et al. | 343/7.9 |
| 3,614,787 | 10/1971 | Hart | 343/365 X |
| 3,748,484 | 7/1973 | Covault | 250/225 |
| 3,772,689 | 11/1973 | Root, Jr. | 343/5 SA |
| 3,918,055 | 11/1975 | Shimizu et al. | 343/361 |
| 3,945,005 | 3/1976 | Dunn | 343/5 PD |
| 4,053,882 | 10/1977 | Van Etten | 343/361 |
| 4,068,234 | 1/1978 | O'Meara | 343/17 |
| 4,106,014 | 8/1978 | Dunn | 343/5 SA |
| 4,107,678 | 8/1978 | Powell | 343/361 |
| 4,114,153 | 9/1978 | Neidell | 343/361 |
| 4,323,898 | 4/1982 | Barnes et al. | 343/5 SA |
| 4,323,899 | 4/1982 | Barnes et al. | 343/5 SA |
| 4,329,687 | 5/1982 | Kloevekorn et al. | 343/13 R |
| 4,333,008 | 6/1982 | Misek | 250/225 |
| 4,490,719 | 12/1984 | Botwin et al. | 343/5 MM |
| 4,555,703 | 12/1985 | Contrell | 343/5 SA |

FOREIGN PATENT DOCUMENTS 648567 9/1962 Canada.
2044444A 10/1980 United Kingdom.

OTHER PUBLICATIONS

Ormsby et al, *Analytic Coherent Radar Techniques for Target Mapping*, May 1970, IEEE Tran. on Aerospace and Electronic Systems, vol. AES-6, No. 3, pp. 295-305.

Hollinger et al, *A Versatile Millimeter-Wave Imaging System*, Nov. 76, IEEE Tran. on Microwave Theory and Technique, vol. MTT-24, No. 11, pp. 86-793.

*Primary Examiner*—T. H. Tubbesing
*Assistant Examiner*—Gilberto Barrón, Jr.
*Attorney, Agent, or Firm*—Finnegan, Henderson, Farabow, Garrett and Dunner

[57] ABSTRACT

A method for producing a map of a target area illustrating reflective objects at selected range points. A polarized signal of cyclically varying frequency is radiated at the target area and the polarization of the radiated signal is changed at predetermined times. The map of the target area illustrates the magnitude of reflection of the radiated signal at each range point and for each polarization value. The degree of reflectivity for each reflective object in the target area is determined through the use of amplitude only signals.

20 Claims, 7 Drawing Figures

SPINNING LINEAR POLARIZATION RADAR MAPPING METHOD

FIELD OF THE INVENTION

This invention pertains to the art of radar detection and more specifically to a spinning linear polarization radar mapping method for determining a target immersed in clutter.

BACKGROUND OF THE INVENTION

Many different types of systems have been proposed for locating targets, e.g., buildings, armored vehicles, aircraft on the ground, etc., from surrounding clutter, e.g., trees, bodies of water, roads, etc. The systems have included optical recognition techniques, infrared detectors, radar systems, and other types of devices. The effectiveness of each of the systems is affected in different ways by ambient conditions. For example, darkness or inclement weather can render an optical system marginally effective or totally useless in locating targets. Heat detector systems lack the ability to discriminate between actual targets and diversionary warm bodies. Radar systems compatible with small aperture seekers are oftentimes not capable of sufficiently discriminating between targets and surrounding clutter. Thus, there is a continuing need for an improved system to locate potential targets or landmarks located in a cluttered environment.

Within the radar art, it is well known that a polarized signal incident upon clutter can become depolarized on reflection. Accordingly, prior art techniques have considered the use of polarization information to enhance target detection and clutter discrimination by means of radar.

For example, in U.S. Pat. Nos. 4,323,898 and 4,323,899, polarization radar detectors are proposed wherein signals reflected from targets illuminated with quasi-monochromatic electromagnetic signals such as frequency modulated continuous wave (FMCW) radar are received by antennae responsive to orthogonally polarized components of the reflected signals. These received orthogonal signal components are modified such that one component is phase shifted with respect to the other signal component and the amplitudes of the signal component are varied according to predetermined angles of polarization. The resultant signals are further analyzed in a processor which detects a polarization of the reflected signals by estimating the Stokes parameters for the reflected signal. The Stokes parameters are then used to generate detection criteria that are compared to a predetermined threshold level.

Another polarization radar device is described in U.S. Pat. No. 3,945,005 which describes a radar system which includes a periodically pulsed transmitter adapted to generate linearly polarized energy, a duplexer, a conventional receiver, a directional antenna system provided with a rotatable dipole antenna, and a linear polarization rotator interconnecting the duplexer and the dipole antenna. The pulsed transmitter and the dipole antenna are rotated in synchronism and a cathode ray tube indicator is provided for generating a circular trace of the reflected polarized energy.

The systems and techniques described in these three patents as well as the other devices and methods known in the prior art require precise knowledge of the transmitter and/or reflected energies' phase reationships to determine a complete set of the scattering properties of the objects being observed. This results in complicated hardware and data processing system requirements which have caused the prior art systems to be only moderately successful.

OBJECTS AND SUMMARY OF THE INVENTION

Accordingly, it is an object of the present invention to extract target information in a polarization mapping method through amplitude only measurements of reflected radio frequency energy.

Another object of the present invention is the generation of a radar polarization map which can be operated on by any number of mathematical procedures to determine the various properties of a target contained within the map.

Still another object of the present invention is a radar mapping method wherein the reflectivity of objects at specified ranges in a target area is displayed for different polarizations of a radiated signal.

Yet another object of the present invention is a polarization radar mapping method for enhancing the detection by radar of targets within a cluttered environment.

Additional objects and advantages of the present invention will be set forth in part in the description which follows, and in part will be apparent from the description or may be learned from the practice of the invention. The objects and advantages of the invention may be realized and obtained by means of the method steps particularly pointed out in the appended claims.

To achieve the foregoing objects in accordance with the invention, as broadly described herein, a method for indicating the location of targets at range points within a target area comprises the steps of radiating a polarized signal of cyclically varying frequency at the target area, selectively changing the polarization of the radiated signal, receiving return signals comprising reflections of the radiated signal from objects located within the target area, each of the return signals having a characteristic polarization and range, and an amplitude corresponding to the reflectivity of the associated object, and generating a radar map of the target area indicating the associated ranges of reflective objects within the target area for each polarization of the radiated signal.

BRIEF DESCRIPTION OF THE DRAWINGS

The manner in which the method of the present invention operates can best be understood in light of the following detailed description together with the accompanying drawings, in which.

DETAILED DESCRIPTION

Figure 1:
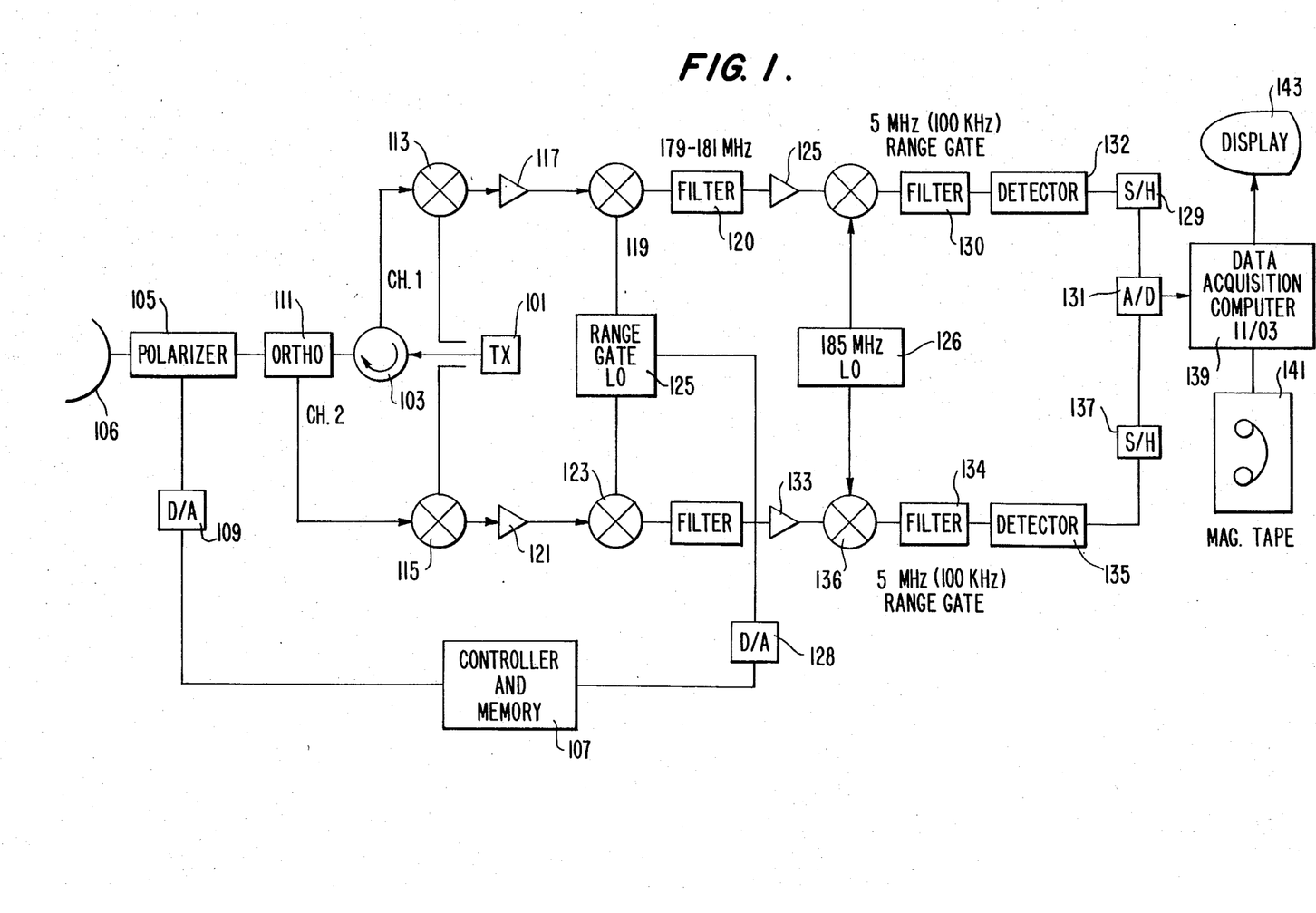
FIG. 1 is a block diagram of a radar system capable of implementing the method of the present invention.

The polarization radar mapping method of the instant invention can be practiced by a radar installation as shown in FIG. 1. The block diagram of the radar system of FIG. 1 is a 45 GHz FMCW instrumentation radar. A transmitter 101 supplies a signal of cyclically varying frequency to a circulator 103. The circulator 103 transmits the swept RF energy through an orthogonal mode junction 111 to a polarizer 105. The polarizer 105 polarizes the signal generated by the transmitter 101 and supplies it to an antenna 106 which radiates the signal in the direction of a target area. It is a function of the polarizer 105 to vary the polarization of the signal under the control of a controller and memory 107.

The controller and memory 107 can be implemented as a microcomputer, a preprogrammed control store, or any other suitable device which will generate and supply to a digital-to-analog converter 109 signals for controlling the polarizer 105 in a specific time sequence. The time sequence will be described in a subsequent portion of this description.

The polarized signal radiated by the antenna 106 is reflected by reflective objects within the target area to generate return signals which are received by the antenna 106 and transmitted to the orthogonal mode junction 111 through the polarizer 105. The orthogonal mode junction 111 separates each return signal into two components, a first channel signal CH1 and a second channel signal CH2. In the preferred embodiment, the first channel signal CH1 and the second channel signal CH2 are oriented vertically and horizontally, physically orthogonal with respect to each other.

In operation, each frequency within a frequency cycle of the radiated signal is reflected by each reflective object within the target area. Thus, the return signals reflected from a particular reflective object in the target area comprise the radiated signal delayed in time by an amount determined by the distance of the associated reflective object from the antenna 106. The reflected return signal has an amplitude (signal strength) determined by the reflectivity of the associated reflective object. The amount of delay for more distant objects within the target area will be greater than for closer objects within the target area.

The first channel one mixer 113 mixes the return signal reflected by an associated reflective object with the transmitted signal from the transmitter 101. The mixing process determines the frequency difference between the return signal and the presently radiating signal. The frequency difference will be constant within a FM sweep for an object whose range remains constant. Thus, for a particular reflective object in the target area, the first channel one mixer 113 outputs a series of frequencies that remain constant, i.e., a frequency determined by the time difference between the corresponding radiated signal and reflected signal, and amplitudes indicating the reflectivity of the reflective object at particular frequencies.

In the example of the preferred embodiment, the period of the radiated signal is 25 microseconds. Thus, the first channel one mixer 113 will output a signal of constant frequency for 25 microseconds with that frequency corresponding to the delay (range) associated with a particular reflective object within the target area.

In the preferred embodiment of the method of the invention, the first channel one mixer 113 outputs range signals having frequencies in the band of 5-150 MHz. Each frequency within that band is associated with a particular range point within the target area. The mixer 113, however, outputs range signals with a non-zero amplitude only for those range points within the target area at which a reflective object is located. The sequences of range signals generated by the mixer 113 as a result of reflections from reflective objects within the target area are repeated for each polarization change of the radiated signal. In effect, the mixer 113 produces a continuous series of sets of range signals with each range signal having a frequency associated with the range of its associated reflective object within the target area, an amplitude corresponding to the reflectivity of the associated reflective object, and a polarization determined by the polarization of the corresponding radiated signal. The identification of reflective objects in the target area is enhanced by gathering and processing results from several different polarizations of the radiated signal.

The CH1 range signals are supplied as inputs to an intermediate frequency amplifier 117 which supplies amplified CH1 range signals to a second channel one mixer 119.

Similarly, in the second channel the first channel two mixer 115 outputs range signals in the frequency band of 5-150 MHz having amplitudes corresponding to the reflectivity of the associated return signals, frequencies relating to the range of the associated reflective object and specific polarizations. The transmitter 101 is used as the local oscillator for the mixer 115 and the CH2 range signals produced by the mixer 115 are supplied as inputs to a second intermediate frequency amplifier 121. The second intermediate frequency amplifier 121 outputs amplified CH2 range signals to an input terminal of a second channel two mixer 123.

The second channel one mixer 119 and the second channel two mixer 123 are connected to a range gate local oscillator 125. The frequency signal outputted by the range gate local oscillator 125 is controlled by the controller and memory 107 through a digital-to-analog converter 128. The outputs of the second channel one mixer 119 comprise channel one range signals having frequencies in a narrow frequency band, e.g., 2.0 MHz.

As stated above, the frequencies of the amplified range signals outputted by the first channel one amplifier 117 are in the frequency range of 5-150 MHz. It is a function of the second channel one mixer 119 to produce range signals in the frequency band of 179-181 MHz. Thus, the range gate local oscillator 125 supplies to the second channel one mixer 119 signals having a frequency such that combination with the output of the first channel one amplifier 117 results in a frequency signal in the range of 179-181 MHz.

In operation, the output of the range gate local oscillator 125 is incremented in 25 KHz steps. Each 25 KHz step corresponds to a range point in the target area. When mixed with the output of the first channel one amplifier 117 in the mixer 119, a frequency signal is produced corresponding to each range point in the target area. The output of the second channel one mixer 119, therefore, corresponds to the frequency signals in the range of 179-181 MHz incremented in 25 KHz steps.

It is a function of the controller and memory 107 to output a digital signal to the digital-to-analog converter 128 such that an appropriate analog signal is produced to increment the output of the range gate local oscillator 125 in 25 KHz steps. It will be understood that the increment could be greater or less than 25 KHz depending upon the number of range points desired.

The output of mixer 119 comprises all of the frequencies of the input at mixer 119, but the output is offset by the frequency of the range gate local oscillator. This offset information is then passed through a narrow bandpass filter 120 having a center frequency of 180 MHz and a passband of 2 MHz. This 2 MHz represents a 20 meter equivalent range extent centered by the proper positioning of the range gate LO. The output of the bandpass filter 120 is then amplified by an amplifier 125 and applied to another stage of mixing.

This next stage of mixing uses a 185 MHz local oscillator 126. In this way, the 180 MHz range/target information is converted to 5 MHz where another, much narrower filter 130 (100 KHz) is used to form the final range gate. By stepping the range gate LO 125 in small frequency steps it is possible to move the range gate filter 130 across the 180 MHz bandpass filters' 2 MHz bandwidth and thus to divide the 20 meters equivalent range extent into much smaller (1 meter) resolution cells. By the appropriate selection of the frequency of the range gate LO 125 it is possible to move the 20 meter equivalent range extent anywhere within the detection capability of the radar. The output of the 5 MHz range gate filter 130 is passed to a video detector 132 which produces a dc voltage that is proportional to the incident amplitude from the filter. This voltage is then sampled and held by S/H 129.

Similarly, the output of the second channel two mixer 123 is a sequence of channel two range signals. These range signals are similar to those of channel 1 in that they are from the same targets but are representative orthogonal to those of channel 1.

The second channel two amplifier 133 selects the frequency signals in the frequency band 184-186 MHz. These selected channel two range signals are provided as inputs to a range gate filter 134 and detector 135 through a mixer 136.

The voltages supplied to the sample and hold circuit 129 are supplied as inputs to an analog/digital converter 131. The analog-to-digital converter 131 generates a digital signal representative of the voltage/reflectivity for each of the range signals.

Similarly, the channel two branch of the radar generates a sequence of output voltage signals corresponding to the various ranges within the target area. The voltage signals are supplied to a sample and hold circuit 137 and to the analog-to-digital converter 131 which converts them into digital signals.

The outputs of the analog-to-digital converter 131 are supplied as inputs to a data acquisition computer 139 which generates the map of objects within the target area. In a preferred embodiment, the map comprises a combination of the digital signals produced by the first channel and the second channel with the composite digital signal corresponding to the square root of the sum of the squares of corresponding first channel digital signals and second channel digital signals. It will be understood that different algorithms or formulas can be used to combine corresponding first channel digital signals and second channel digital signals.

From the data acquisition computer 139, the radar map can be displayed on a display device 143 or stored on a retrievable storage device such as a magnetic tape unit 141.

Figure 2A:
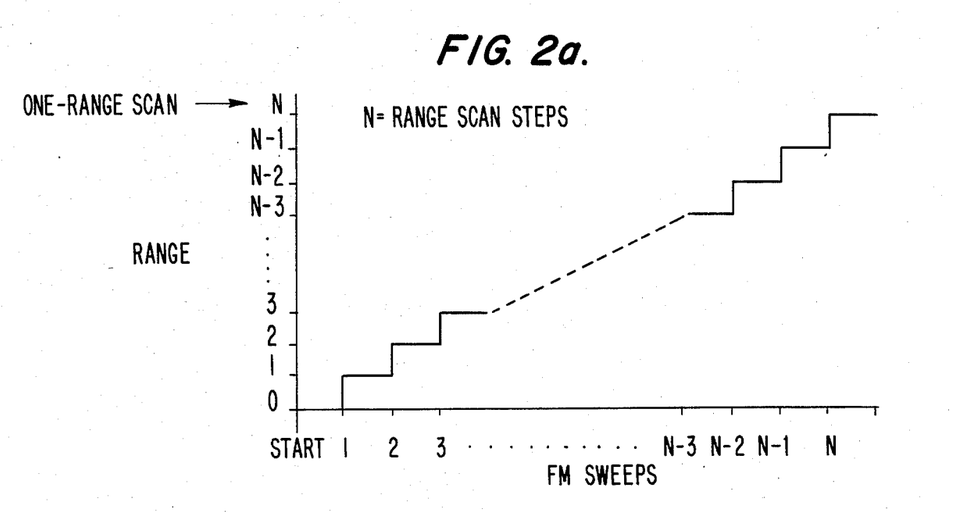
FIGS. 2a and 2b illustrate the range and polarization changes utilized in the method of the instant invention.
Figure 2B:
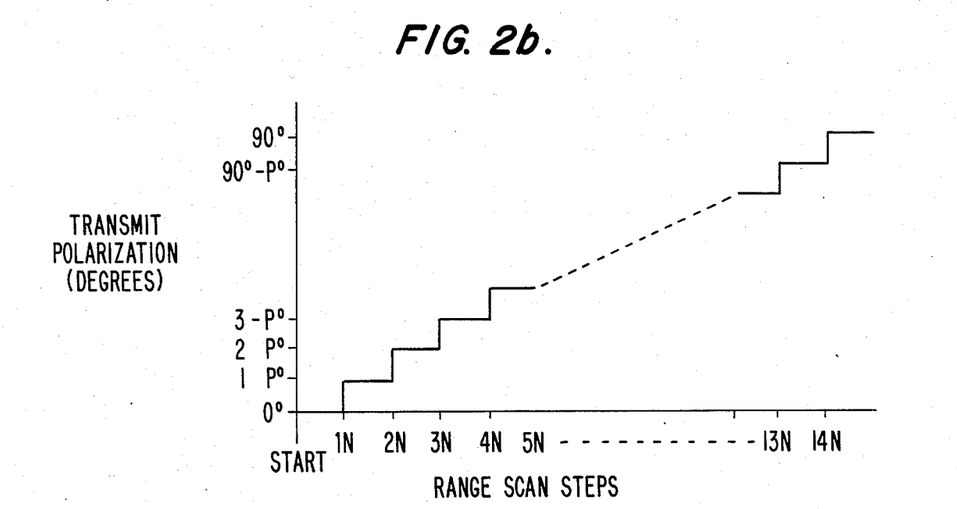

FIGS. 2a and 2b illustrate the cycles for the range and polarization of the radar. In FIG. 2a, a plot is shown of the range within the target area and the associated FM sweep of the transmitted signal. Thus, range 1 corresponds to FM sweep 1, range 2 corresponds to FM sweep 2, range 3 corresponds to FM sweep 3, and range N corresponds to FM sweep N. The number of range positions within the target area is a matter of design choice and of probable target and target area size.

FIG. 2b is a plot of the polarization in degrees and the range scan steps. As shown in FIG. 2b, the first N range scan steps are performed with the transmitter at polarization of 0°. The next N range scan steps are performed at polarization of 0°+P°. The final N range scan steps in the last polorization setting in a polarization cycle are performed at polarization of 90°. It will be understood that the number of changes in polarization can be greater or less than 14 as illustrated in FIG. 2b. It is a function of the controller and memory 107 to generate control signals for controlling the polarizer 105. As shown in FIG. 2(b) a control signal is generated every N scan steps to cause a change in polarization.

Figure 3:
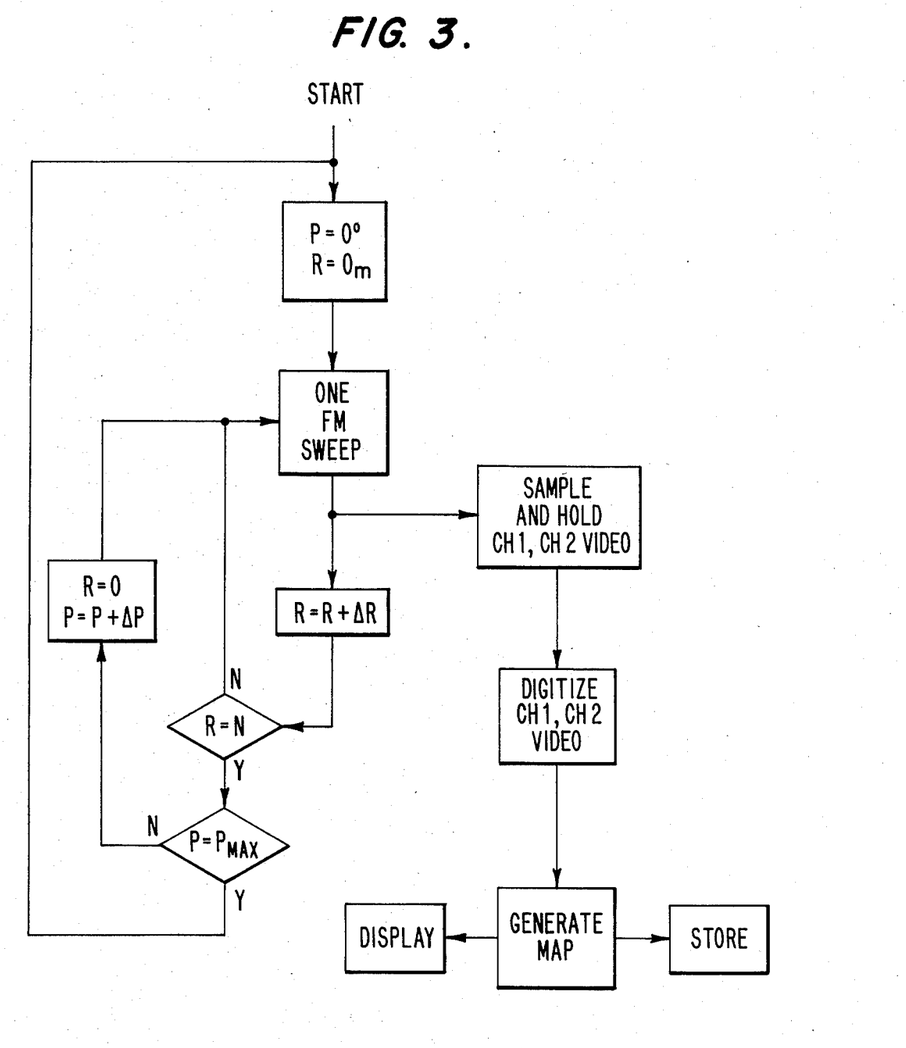
FIG. 3 is a flow diagram illustrating the operation sequence of the method of the present invention.

FIG. 3 is a flow diagram illustrating the operation of the present invention. Initially, the polarization is set to a starting point, such as 0°, and a frequency sweep of the target area is performed by the scanning signal starting at range of zero meters. The frequency sweep comprises transmitting the variable frequency signal through a complete cycle of frequency variations in the direction of the target area and receiving return signals which are reflections of the scanning signal from reflective objects in the target area.

Processing under the method of the present invention continues by performing additional frequency sweeps of the target area for different ranges until a maximum range of (N) is reached and by processing the return signals received from each frequency sweep.

As shown in FIG. 3, the current polarization value P is compared to a maximum polarization value of Pmax, e.g., 90°. If P is equal to Pmax, then frequency sweeps have been performed for each of the n different polarization values. If P is less than Pmax, then the current value of the polarization is incremented by a specific number of degrees, $\Delta P$, and additional sweeps are performed beginning at range R equal zero.

After the return signals are correlated with specific ranges, a sequence of range signals is generated for each polarization value. As described with reference to FIG. 2a, range n is associated with FM sweep n. Thus, the range signal sequence is generated by assembling a sequence of return signals associated with increasing ranges. The amplitude of each of the return signals corresponds to the reflectivity of reflective objects associated therewith. If at a particular range there is no reflective object in the target area, the range signal at the corresponding time position within the range signal sequence will have a negligible amplitude. On the other hand, if a reflective object is located at a specific range within the target area, then the return signal associated with that range will have a significantly greater amplitude.

The amplitudes of the range signals are converted to voltage levels to produce, in the preferred embodiment, channel one and channel two signals comprising a sequence of voltage levels associated with specific ranges in the target area. The next step is to digitize the voltage levels and to generate a target map by combining the digitized signals in a selected manner. In the preferred embodiment, processing of the return signals is performed in parallel in two different channels with the signals in the two channels corresponding to each other and orthogonal with respect to each other. After the signals from each channel are digitized, they are combined to form composite digital signals which constitute a map of the target area. A target area map can be retrievably stored on magnetic tape or some other storage device and can also be displayed on an appropriate display device.

Figure 4:
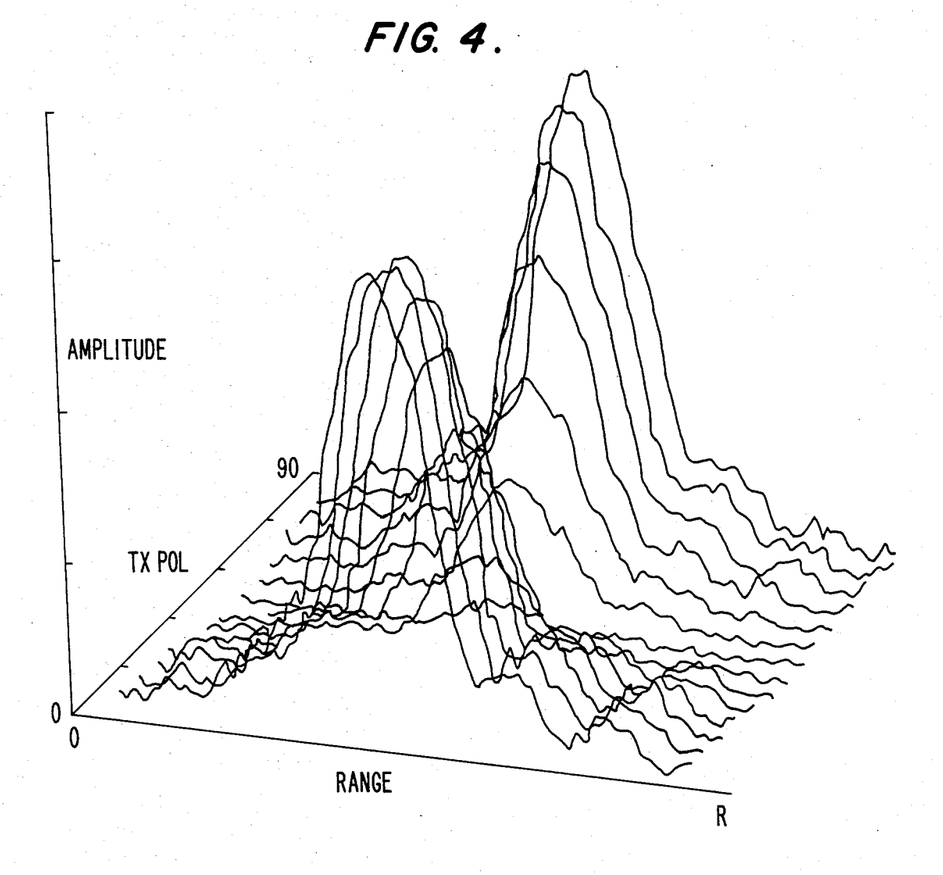
FIGS. 4–6 illustrate maps of reflective objects within the target area as generated by the method of the present invention.

FIG. 4 is a reproduction of the display of the channel one digital signals produced by the data acquisition computer 139 and supplied to the display device 143. The range within the target area is set forth along the x axis, the polarization of the transmitted signal is graphed along the y axis, and the amplitude of the return signals which represent the reflectivity of objects within the target area is graphed along the z axis. Thus, as shown in FIG. 4, the display output is actually a range/amplitude graph for each variance in polarization of the transmitter.

Figure 5:
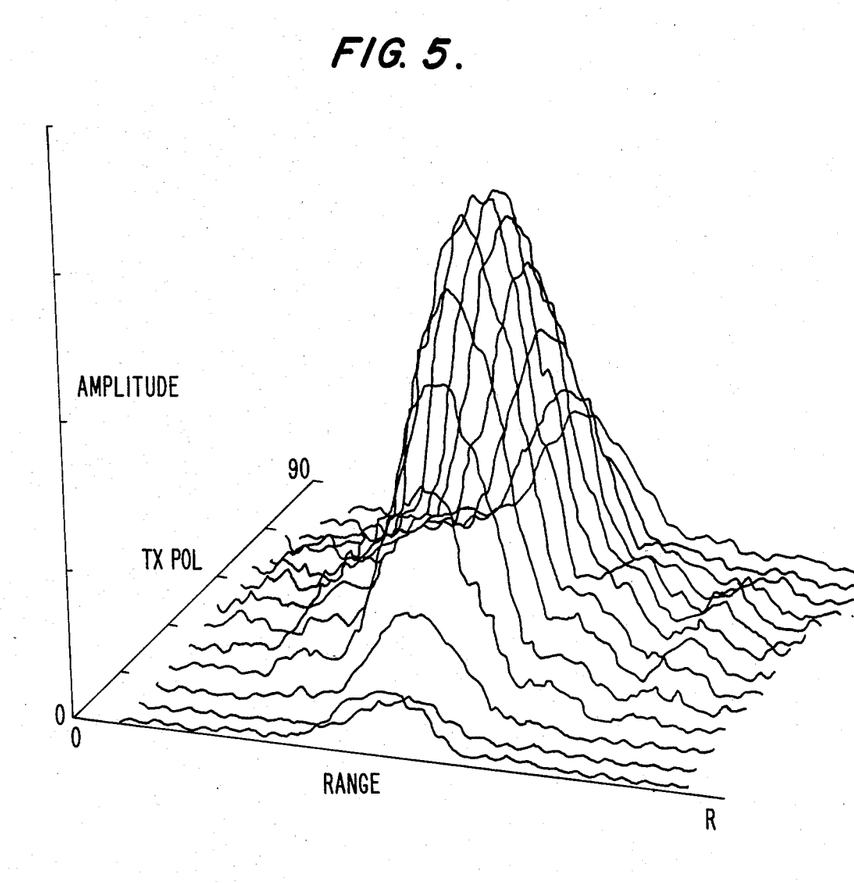

FIG. 5 is a graphical illustration of the channel two digital signals as supplied to the display device 143 by the data acquisition computer 139. Again, FIG. 5 is a range/amplitude graph of the return signals for each polarization change of the transmitted signal. The amplitude represents the reflectivity of the objects within the target area.

Figure 6:
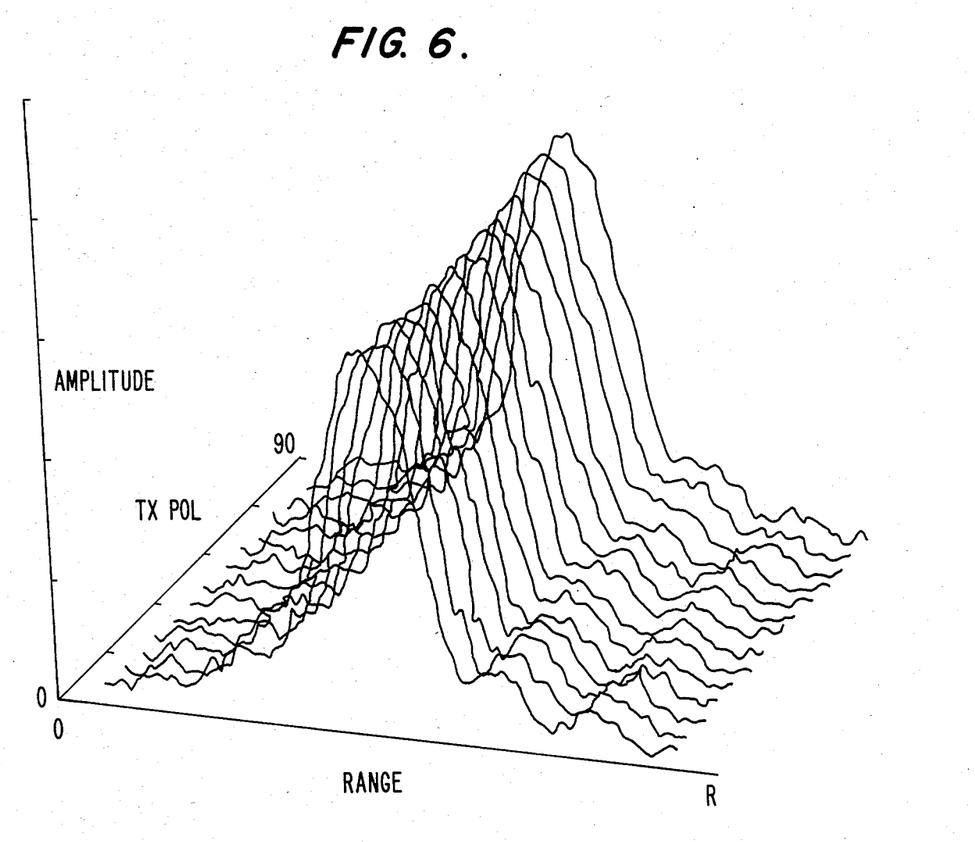

FIG. 6 illustrates a composite of the channel one digital signals and the channel two digital signals. As described above, FIG. 6 is produced by the data acquisition computer 139 computing the square root of the sum of the squares of corresponding channel one digital signals and channel two digital signals.

While it will be understood that the preferred method of the invention disclosed above provides the advantages and features described, it will be understood that the invention is susceptible to modification, variation, and change without departing from the proper scope or fair meaning of the following claims.

What is claimed is:

1. A method for generating a radar map for a plurality of range points in a target area comprising the steps of:
    radiating a single polarized signal of cyclically varying frequency at the target area;
    selectively changing the polarization of said radiated signal;
    receiving return signals comprising reflections of the radiated signal from associated objects within the target area, each of the return signals having a characteristic polarization and range, and an amplitude corresponding to the reflectivity of the associated object;
    generating a range signal corresponding to each of said return signals, each of the range signals associated with one of said objects having the same frequency and an amplitude proportional to the amplitude of the corresponding return signal;
    selecting by frequency a range signal associated with each of the range points in the target area;
    digitizing each of said selected range signals to generate a corresponding mapping signal; and
    producing from said mapping signals the radar map of the target area, including an indication of the reflectivity at each range point in the target area for each polarization of the radiated signal.

2. A method for indicating the location of targets at range points within a target area comprising the steps of:
    radiating a polarized signal of cyclically varying frequency at the target area, each of the range points being associated with a different one of said frequencies of said radiated signal;
    selectively changing the polarization of said radiated signal;
    receiving return signals comprising reflections of the radiated signal from objects located within the target area, each of the return signals having a characteristic polarization and frequency, and an amplitude corresponding to the reflectivity of the associated object; and
    generating a radar map of the target area indicating the associated ranges of reflective objects within the target area for each polarization of the radiated signal.

3. A method according to claim 2 wherein said generating step comprises the steps of:
    dividing each return signal into corresponding first and second channel signals;
    digitizing said first and second channel signals; and
    combining said digitized first and second channel signals to produce said radar map.

4. A method according to claim 2 wherein each frequency cycle of the radiated signal comprises a linearly increasing frequency for the radiated signal corresponding to increasing ranges within the target area.

5. A method according to claim 2 wherein said step of dividing includes the steps of:
    separating each of said return signals into corresponding first and second component signals;
    mixing said first component signal and said second component signal separately with a predetermined frequency signal;
    amplifying said mixed first component signal and said mixed second component signal;
    selecting, from each of said amplified first component signals and second component signals, n frequency signals, each of said n frequency signals corresponding to one of n different ranges within the target area; and
    amplifying said selected n first component frequency signals and n second component frequency signals to produce n first and second channel signals.

6. A method according to claim 5 wherein said digitizing step includes the steps of:
    converting each of said amplified first component frequency signals and second component frequency signals to a corresponding first component voltage level and a corresponding second component voltage level, respectively; and
    generating a sequence of first digital signals and a sequence of second digital signals, each of said first digital signals representing a different one of said first component voltage levels and each of said second digital signals representing a different one of said second component voltage levels.

7. A method according to claim 6 wherein said step of generating includes combining corresponding first digital channel signals and second digital channel signals to generate mapping signals corresponding to the amplitudes of target reflections for selected combinations of polarization and frequency of the radiated signal.

8. A method according to claim 3 wherein said step of combining includes calculating, for each selected combination of frequency and polarization of the return signals, the square root of the sum of the square of each of the corresponding digitized first channel signals and second channel signals.

9. A method according to claim 2 further including the step of displaying the radar map in a manner indicating the range position of a reflective object within the target area for each of the different polarizations of the radiated signal.

10. A method according to claim 5 wherein said first and second component signals are orthogonal with respect to each other.

11. A method according to claim 7 further including the step of retrievably storing on a magnetic memory said generated mapping signals.

12. A method for generating a radar map of a target area comprising the steps of:
   radiating a polarized signal of cyclically varying frequency toward said target area;
   selectively changing the polarization of said radiated signal, each of said polarization changes coinciding with the beginning of one of said frequency cycles;
   receiving return signals comprising the reflections of said radiated signal from associated reflective objects within the target area, each of said return signals having a characteristic polarization, amplitude, and frequency;
   converting each of said return signals into corresponding discrete signals, each of said discrete signals having an amplitude related to the signal strength of said corresponding return signal, a frequency identifying the range of said reflective object associated with said corresponding return signal, and the polarization of said corresponding return signal; and
   correlating said discrete signals to produce a object map of reflective objects at associated ranges within the target area for each of said polarizations of said radiated signal.

13. A method according to claim 12 further including the step of displaying said object map.

14. A method according to claim 12 further including the step of retrievably storing said object map in a memory device.

15. A method according to claim 12 wherein said step of converting each of said return signals into corresponding discrete signals comprises the steps of:
   mixing said return signals with another frequency signal to produce corresponding mixed return signals having amplitudes corresponding to the signal strength of said corresponding return signal and a frequency identifying the range of said associated reflective object within the target area;
   amplifying said mixed return signals;
   gating said amplified mixed return signals to an analog-to-digital converter in a time sequence corresponding to the range associated with said amplified mixed return signal; and
   generating, for each polarization of the radiated signal, a corresponding sequence of digital signals having values corresponding to the amplitudes of said gated mixed return signals and a sequence corresponding to the ranges of reflective objects in the target area.

16. A method according to claim 15 further including the step of displaying said digital signals in a time sequence according to the frequency of said mixed return signals whereby a three-dimensional radar map of the target area is shown with the dimensions representing the range of reflective objects within the target area, the signal strength of the return signals reflected thereby, and each polarization change of said radiated signal.

17. A method according to claim 15 further including the step of retrievably storing said digital signals in a memory device.

18. A method for generating a radar map of a target area comprising the steps of:
   radiating at the target area a single polarized signal of cyclically varying frequency and polarization;
   receiving return signals comprising the reflections of the radiated signal from reflective objects in the target area, each of the return signals being associated with a reflective object and having an associated frequency and polarization and an amplitude corresponding to the reflectivity of said associated reflective object;
   producing for each of said return signals a corresponding range signal having a frequency indicating the range of this reflective object associated with the return signal and an amplitude corresponding to the reflectivity of the reflective object associated therewith, the range signals being produced in a sequence corresponding to the variation in polarization of the radiated signal;
   digitizing each of said return signals; and
   generating said radar map of the target area indicating the range and reflectivity of each reflective object therein for each of the polarizations of the scanning beam.

19. A method according to claim 18 wherein said radiating step comprises the steps of:
   varying the frequency of the radiated signal in a predetermined cyclical manner; and
   changing the polarization of the radiated signal at the beginning of predetermined frequency cycles thereof.

20. A method according to claim 18 wherein said step of generating includes displaying each of the digitized return signals to produce a three-dimensional map of the target area representing the range of reflective objects within the target area, the signal strength of the return signals reflected thereby, and each polarization change of the radiated signal.

* * * * *